United States Patent [19]

Tagiri

[11] Patent Number: 5,780,982

[45] Date of Patent: Jul. 14, 1998

[54] METHOD OF AND APPARATUS FOR CONTROLLING ROTATION NUMBER OF MOTOR

[75] Inventor: Takao Tagiri, Yamanashi-ken, Japan

[73] Assignees: Pioneer Electronic Corporation; Pioneer Video Corporation, both of Japan

[21] Appl. No.: 606,754

[22] Filed: Feb. 27, 1996

[30] Foreign Application Priority Data

Feb. 28, 1995 [JP] Japan ................................. 7-040370

[51] Int. Cl.[6] ............................................. H02K 23/00
[52] U.S. Cl. ................. 318/254; 318/138; 318/439; 369/48; 369/43
[58] Field of Search .................... 318/254, 138, 318/439; 369/48, 43

[56] References Cited

U.S. PATENT DOCUMENTS

| 5,539,723 | 7/1996 | Hoshino et al. | 369/48 X |
| 5,559,777 | 9/1996 | Maeda et al. | 369/48 X |
| 5,574,707 | 11/1996 | Hirai | 369/48 |

FOREIGN PATENT DOCUMENTS

4-16867  3/1992  Japan .

*Primary Examiner*—Karen Masih
*Attorney, Agent, or Firm*—Finnegan, Henderson, Farabow, Garrett & Dunner, L.L.P.

[57] ABSTRACT

A rotation number of a motor adapted to rotate a record medium having a disc shape with respect to a pickup is controlled. The controlling method is provided with steps of: calculating switching positions on the record medium, at each of which a changing rate of an actual rotation number of the motor in a radial direction of the record medium is to be changed such that an error of the actual rotation number with respect to an ideal rotation number for rotating the record medium by a constant linear velocity is within a predetermined range, the actual rotation number at each of the switching positions and the changing rate between each two of the switching positions adjacent to each other; detecting a radial position of the pickup with respect to the record medium when the pickup is performing one of the recording and reproducing operations; and controlling the motor to change the actual rotation number to be equal to the calculated rotation number when the pickup is positioned at said each switching position and to change the actual rotation number by the calculated changing rate between said each two of the switching positions adjacent to each other on the basis of the detected radial position.

14 Claims, 8 Drawing Sheets

METHOD OF AND APPARATUS FOR CONTROLLING ROTATION NUMBER OF MOTOR

BACKGROUND OF THE INVENTION

1. Field of the Invention

The present invention generally relates to a method of and an apparatus for controlling the rotation number of a motor, and more particularly to a method of and an apparatus for controlling the rotation number of a motor such as a spindle motor for rotating a record medium having a disc shape such as an optical disc.

2. Description of the Related Art

As a method of rotating an optical disc, there are the CAV (Constant Angular Velocity) method, in which the optical disc is rotated while keeping the angular velocity constant, and the CLV (Constant Linear Velocity) method, in which the optical disc is rotated while keeping the linear velocity constant regardless of the radial position of the optical pickup.

According to the CLV method, the rotation number is reduced as the optical pickup goes toward the outer circumference of the optical disc. Thus, in case of recording sequentially the information divided into pieces by the unit time interval, the optical disc of the CLV type has advantages that the recordable information volume thereof is more than that of the CAV type, and that the recordable time period thereof is longer than that of the CAV type.

Figure 6:
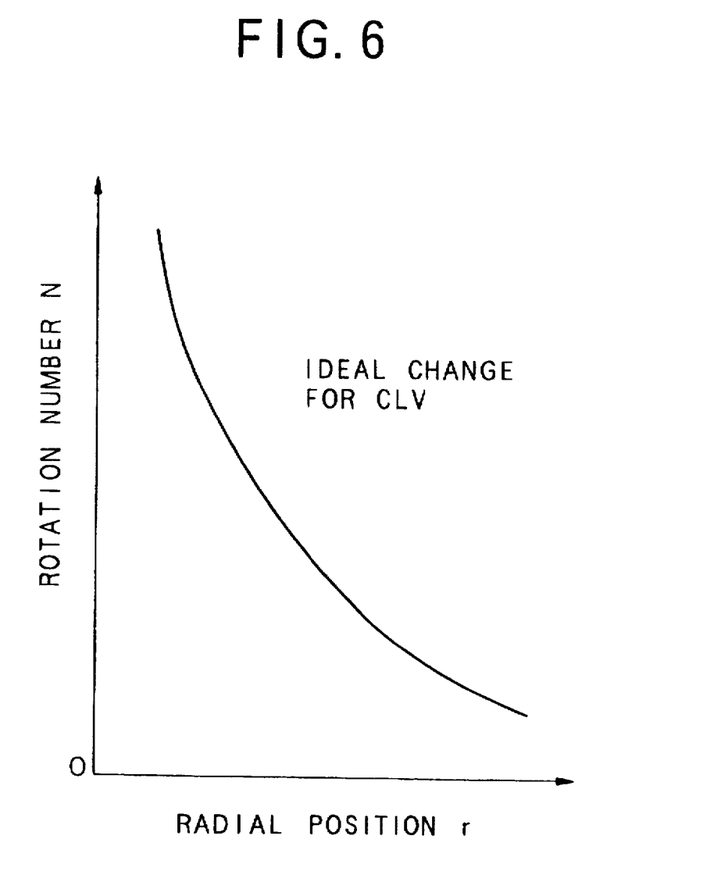
FIG. 6 is a graph showing an ideal relationship between the radial position and the rotation number for the CLV method.

In the CLV method, since the linear velocity of the optical disc is to be controlled constant regardless of the radial position of the optical pickup, the rotation number of the optical disc is controlled to be continuously reduced in accordance with the change of the radial position of the optical pickup as shown in FIG. 6 in an ideal case. Therefore, a control signal to control the rotation number is to be changed continuously in accordance with the change of the radial position of the optical pickup.

However, it is practically very difficult to change the control signal so as to change the rotation number smoothly and continuously as shown in FIG. 6.

Thus, the relationship between the radial position r and the rotation number N of FIG. 6 may be approximated as following.

Figure 7:
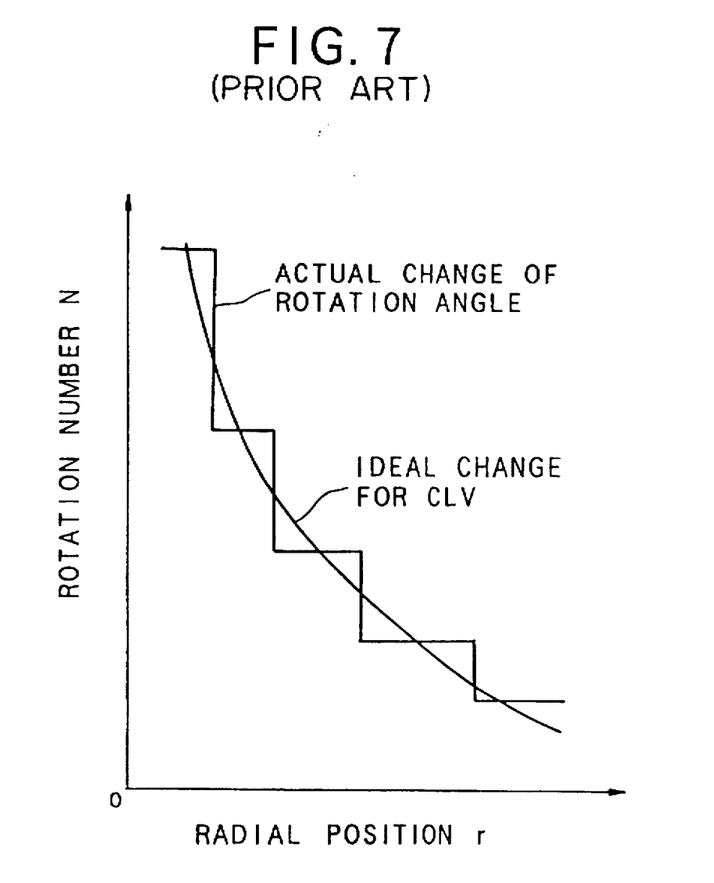
FIG. 7 is a graph showing a relationship between the radial position and the rotation number in one method according to the related art.

Namely, as shown in FIG. 7, the change of the rotation number may be approximated to the ideal change of FIG. 6 by changing the control signal to control the rotation number so as to change gradually by stages. In this case, by increasing the number of the stages, the actual change of the rotation number N is approximated to the ideal change of the rotation number of FIG. 6. According to the method of FIG. 7, the change of the rotation number, which substantially resembles that of the ideal case for CLV method, can be obtained by use of a relatively simple circuit construction.

Figure 8:
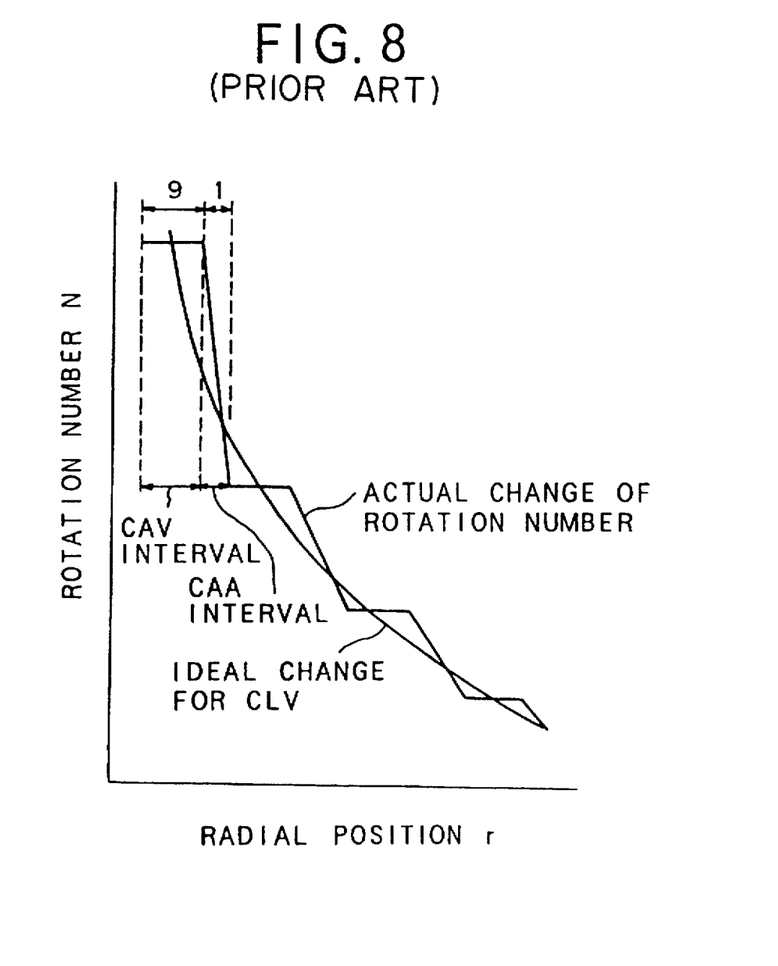
FIG. 8 is a graph showing a relationship between the radial position and the rotation number in another method according to the related art.

Alternatively, as shown in FIG. 8, the change of the rotation number may be approximated to the ideal change of FIG. 6, by changing the control signal to control the rotation number such that the intervals, in each of which the rotation number N is kept constant (i.e. the interval for the CAV control), and the intervals, in each of which the rotation number is changed by a constant changing rate (i.e. the interval for the CAA (Constant Angular Acceralation) control), are alternatively disposed, as disclosed by Japanese Patent Publication Hei 4-16867. In this method, the signal corresponding to the information to be recorded onto the optical disc is an analog signal which has a synchronization signal, and is recorded by forming the information track in a coaxial shape or a spiral shape. Thus, in order to reduce the leakage of the information between the information tracks adjacent to each other (i.e. so-called cross talk), the CAV intervals where the information is recorded and reproduced by the CAV method occupies dominantly the total information recordable area of one optical disc. More, concretely, in FIG. 8, the ratio of the total intervals recorded and reproduced by the CAV method to the total intervals recorded and reproduced by the CAA method is about 9:1. According to this method, the harmful influence of the cross talk at the time of reproducing the information can be reduced while the recordable information volume approximately same as that of the optical disc of the CLV type can be realized.

However, according to the method of FIG. 7, since the control signal changes by stages, it has such a problem that the phase error in the control signal becomes large and that the stability of the servo system for controlling the rotation number of the spindle motor is reduced.

Namely, since the control signal inputted to the servo system is changed by stages, phase error is generated in the servo system before and after the change of the control signal, so that it takes a certain time period until the servo system is stabilized after the change, i.e., the stability of the servo system is certainly degraded.

On the other hand, according to the method of FIG. 8, since each interval in which the motor is rotated by the CAV method is long, the error is large as compared with the ideal relationship between the radial position and the rotation number of FIG. 6. Further, according to the method of FIG. 8, since each interval of the CAV method is long, the change in the rotation number between one interval of the CAV method and the other interval of the CAV method is large. Thus, the change in the control signal is also large, so that the method of FIG. 8 has such a problem that the phase error is increased, and that the stability of the servo system is reduced in the same manner as the method of FIG. 7.

SUMMARY OF THE INVENTION

It is therefore an object of the present invention to provide a method of and an apparatus for controlling the rotation number of a motor, which can obtain the change of the rotation number close to the change of the ideal rotation number for the CLV method.

The above object of the present invention can be achieved by a first method of controlling a rotation number of a motor adapted to rotate a record medium having a disc shape with respect to a pickup, which performs at least one of recording and reproducing operations with respect to the record medium. The first method is provided with steps of: calculating switching positions on the record medium, at each of which a changing rate of an actual rotation number of the motor in a radial direction of the record medium is to be changed such that an error of the actual rotation number with respect to an ideal rotation number for rotating the record medium by a constant linear velocity is within a predetermined range which is set in advance, the actual rotation number at each of the switching positions and the changing rate between each two of the switching positions adjacent to each other; detecting a radial position of the pickup with respect to the record medium when the pickup is performing one of the recording and reproducing operations; and controlling the motor to change the actual rotation number to be equal to the calculated rotation number corresponding to each switching position when the pickup is positioned at said each switching position and to change the actual rotation number by the calculated changing rate between said each two of the switching positions adjacent to each other on the basis of the detected radial position.

According to the first method of the present invention, at first, the switching positions, the actual rotation number and the changing rate are calculated. When one of the recording and reproducing operations is performed by the pickup, the radial position of the pickup with respect to the record medium is detected. Here, when the pickup is positioned at said each switching position, the actual rotation number is changed by the motor to be equal to the calculated rotation number corresponding to each switching position on the basis of the detected radial position. When the pickup is positioned between the switching positions, the actual rotation number is changed by the motor by the calculated changing rate between said each two of the switching positions adjacent to each other on the basis of the detected radial position. At this time, the error of the actual rotation number with respect to the ideal rotation number for rotating the record medium by a constant linear velocity is within a predetermined range which is set in advance. Accordingly, the change of the rotation number can be obtained which is close to the change of the ideal rotation number for the CLV method.

In one aspect of the first method of the present invention, in the calculating step, the switching positions are calculated such that the changing rate has a value other than zero with respect to whole recordable area of the record medium. Thus, the relationship between the rotation number and the radial position realized by the first method can be easily approximated to the ideal relationship of the CLV method.

In another aspect of the first method of the present invention, in the calculating step, the switching positions are calculated such that the changing rate is gradually decreased by stages toward an outer circumference of the record medium. Thus, the relationship between the rotation number and the radial position realized by the first method can be easily approximated to the ideal relationship of the CLV method.

The above object of the present invention can be also achieved by a second method of controlling a rotation number of a motor adapted to rotate a record medium having a disc shape with respect to a pickup, which performs at least one of recording and reproducing operations with respect to the record medium. The second method is provided with steps of: calculating radial positions on the record medium corresponding to each of a plurality of first intervals, in each of which an actual rotation number of the motor is to be changed by a constant changing rate in a radial direction of the record medium, and each of a plurality of second intervals, in each of which the actual rotation number is constant, the changing rate in each of the first intervals and the actual rotation number in each of the second intervals such that an error of the actual rotation number with respect to an ideal rotation number for rotating the record medium by a constant linear velocity is within a predetermined range which is set in advance, the first intervals and the second intervals being alternatively disposed; detecting a radial position of the pickup with respect to the record medium when the pickup is performing one of the recording and reproducing operations; and controlling the motor to change the changing rate of the actual rotation number corresponding to each first interval to be equal to the calculated changing rate when the pickup is positioned in said each first interval, and to change the actual rotation number to be equal to the calculated rotation number corresponding to each second interval when the pickup is positioned in said each second interval on the basis of the detected radial position.

According to the second method of the present invention, at first, the switching positions, the actual rotation number and the changing rate are calculated. When one of the recording and reproducing operations is performed by the pickup, the radial position of the pickup with respect to the record medium is detected. Here, when the pickup is positioned in said each first interval, the changing rate of the actual rotation number corresponding to each first interval is changed to be equal to the calculated changing rate on the basis of the detected radial position. When the pickup is positioned in said each second interval, the actual rotation number is changed to be equal to the calculated rotation number corresponding to each second interval on the basis of the detected radial position. At this time, the error of the actual rotation number with respect to the ideal rotation number for rotating the record medium by a constant linear velocity is within a predetermined range which is set in advance. Accordingly, the change of the rotation number can be obtained which is close to the change of the ideal rotation number for the CLV method.

In one aspect of the second method of the present invention, a length of each of the first intervals is longer than that of each of the second intervals adjacent to said each of the first intervals. Thus, the relationship between the rotation number and the radial position realized by the first method can be easily approximated to the ideal relationship of the CLV method. Further, the error of the actual rotation number with respect to the ideal rotation number due to a drastic change of the actual rotation number can be reduced. In this case, it is preferable that a ratio of a time period corresponding to the length of said each of the second intervals with respect to a time period corresponding to a total length of said each of the second intervals and said each of the first intervals adjacent to said each of the second intervals is not greater than 0.1. Thus, the error due to the drastic change can be certainly reduced.

In another aspect of the second method of the present invention, in the calculating step, the switching positions are calculated such that the changing rate in each of the first intervals is gradually decreased by stages toward an outer circumference of the record medium. Thus, the relationship between the rotation number and the radial position realized by the first method can be easily approximated to the ideal relationship of the CLV method.

The above object of the present invention can be also achieved by a first apparatus for controlling a rotation number of a motor adapted to rotate a record medium having a disc shape with respect to a pickup, which performs at least one of recording and reproducing operations with respect to the record medium. The first apparatus is provided with: a calculation unit for calculating switching positions on the record medium, at each of which a changing rate of an actual rotation number of the motor in a radial direction of the record medium is to be changed such that an error of the actual rotation number with respect to an ideal rotation number for rotating the record medium by a constant linear velocity is within a predetermined range which is set in advance, the actual rotation number at each of the switching positions and the changing rate between each two of the switching positions adjacent to each other; a detection unit for detecting a radial position of the pickup with respect to the record medium when the pickup is performing one of the recording and reproducing operations; and a controller for controlling the motor t change the actual rotation number to be equal to the calculated rotation number corresponding to each switching position when the pickup is positioned at said each switching position and to change the actual rotation number by the calculated changing rate between said each two of the switching positions adjacent to each other on the basis of the detected radial position.

Accordingly, the above described first method of the present invention can be performed by the first apparatus of the present invention.

In one aspect of the first apparatus of the present invention, the calculation unit calculates the switching positions such that the changing rate has a value other than zero with respect to whole recordable area of the record medium.

In another aspect of the first apparatus of the present invention, the calculation unit calculates the switching positions such that the changing rate is gradually decreased by stages toward an outer circumference of the record medium.

The above object of the present invention can be also achieved by a second apparatus of controlling a rotation number of a motor adapted to rotate a record medium having a disc shape with respect to a pickup, which performs at least one of recording and reproducing operations with respect to the record medium. The second apparatus is provided with: a calculation unit for calculating radial positions on the record medium corresponding to each of a plurality of first intervals, in each of which an actual rotation number of the motor is to be changed by a constant changing rate in a radial direction of the record medium, and each of a plurality of second intervals, in each of which the actual rotation number is constant, the changing rate in each of the first intervals and the actual rotation number in each of the second intervals such that an error of the actual rotation number with respect to an ideal rotation number for rotating the record medium by a constant linear velocity is within a predetermined range which is set in advance, the first intervals and the second intervals being alternatively disposed; a detection unit for detecting a radial position of the pickup with respect to the record medium when the pickup is performing one of the recording and reproducing operations; and a controller for controlling the motor to change the changing rate of the actual rotation number corresponding to each first interval to be equal to the calculated changing rate when the pickup is positioned in said each first interval, and to change the actual rotation number to be equal to the calculated rotation number corresponding to each second interval when the pickup is positioned in said each second interval on the basis of the detected radial position.

Accordingly, the above described second method of the present invention can be performed by the second apparatus of the present invention.

In one aspect of the second apparatus of the present invention, a length of each of the first intervals is longer than that of each of the second intervals adjacent to said each of the first intervals. In this case, it is preferred that a ratio of a time period corresponding to the length of said each of the second intervals with respect to a time period corresponding to a total length of said each of the second intervals and said each of the first intervals adjacent to said each of the second intervals is not greater than 0.1.

In another aspect of the second apparatus of the present invention, the calculation unit calculates the switching positions such that the changing rate in each of the first intervals is gradually decreased by stages toward an outer circumference of the record medium.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

(I) First Embodiment

First, a construction of a recording apparatus for optically recording information onto an optical disc as a first embodiment of the present invention will be explained with referring to FIG. 1.

Figure 1:
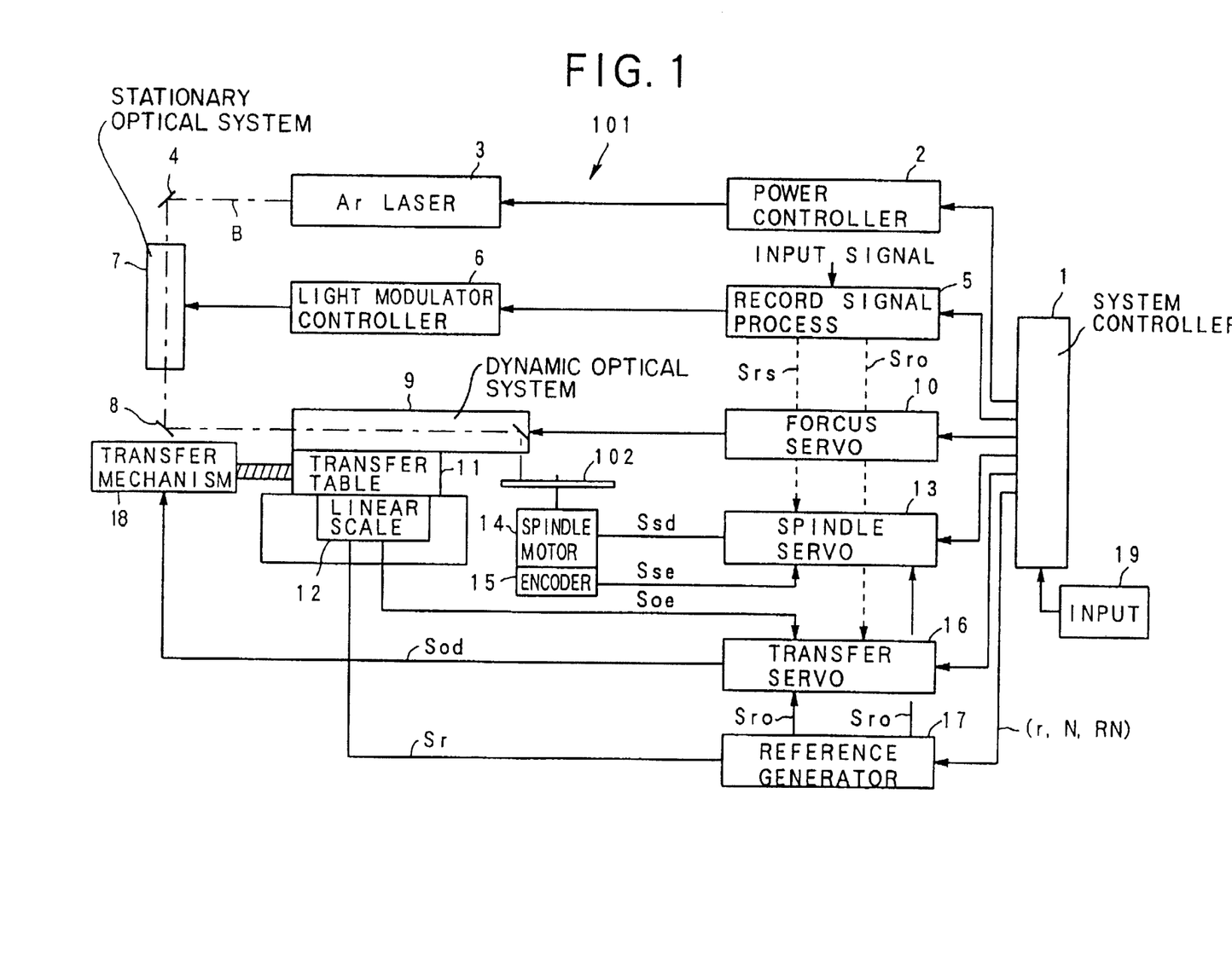
FIG. 1 is a block diagram of an apparatus for optically recording information as a first embodiment of the present invention.

In FIG. 1, a recording apparatus 101 for optically recording information onto an optical disc 102 is provided with: a system controller 1; a power controller 2; an Ar (Argon) laser 3; a reflection mirror 4; a record signal process unit 5; a light modulator controller 6; a stationary optical system 7; a reflection mirror 8; a dynamic optical system 9; a focus servo unit 10; a transfer table 11; a linear scale 12; a spindle servo unit 13; a spindle motor 14; an encoder 15; a transfer servo unit 16; a reference generator 17; a transfer mechanism 18; and an input unit 19.

The system controller 1 is provided with a microcomputer etc., and is constructed to perform an overall control of the recording apparatus 101 and to calculate a radial position r of an optical pickup in the dynamic optical system 9, a rotation number N at the radial position r, a changing rate RN in the rotation number N and so on, which are used to perform the operation of the present embodiment.

The power controller 2 controls an output power of the Ar laser 3 under the control of the system controller 1. The Ar laser 3 outputs a laser beam B for recording information. The output power of the laser beam B is controlled by the power controller 2. The reflection mirror 4 is adapted to guide the outputted laser beam B to the stationary optical system 7.

The record signal process unit 5 is provided with a pre-formatter etc., and is constructed to process an input signal from the external of the recording apparatus 101 to be recorded, convert it to a record signal recordable on the optical disc 102 and finally output it to the light modulator controller 6, under the control of the system controller 1. The light modulator controller 6 controls a light modulator which is included in the stationary optical system 7 on the basis of the record signal outputted from the record signal process unit 5.

The stationary optical system 7 is provided with an E/O (Electro/Optical) converting element etc., and modulates the laser beam B from the reflection mirror 4 on the basis of the record signal under the control of the light modulator controller 6. The reflection mirror 8 guides the laser beam B modulated by the stationary optical system 7 toward the dynamic optical system 9.

The dynamic optical system 9 is provided with an optical pickup. The optical pickup consists of an objective lens for converging the laser beam B from the reflection mirror 8 onto the optical disc 102 to which the information is to be recorded, an actuator for actuating the objective lens in the focusing and tracking directions, and so on. The dynamic optical system is movable in the radial direction of the optical disc 102 which is rotated.

The focus servo unit 10 is constructed to perform the focus servo control of the laser beam B onto the optical disc 102 by the optical pickup in the dynamic optical system 9 under the control of the system controller 1. The transfer table 11 is constructed to move the dynamic optical system 9 in the radial direction of the optical disc 102 by the action of the transfer mechanism 18.

The linear scale 12 is interlined with the transfer table 11 and detects the radial position of the optical pickup corresponding to the irradiation position of the laser beam B on the optical disc 102. The linear scale 12 outputs a radial position signal Sr and an encoder pulse Soe for the transfer servo control. The spindle servo unit 13 outputs a drive signal Ssd to perform the servo control of the rotation number of the spindle motor 14, which rotates the optical disc 102, on the basis of the encoder pulse Sse from the encoder 15 and a spindle reference signal Srs from the reference generator 17, under the control of the system controller 1.

The encoder 15 is interlinked with the spindle motor 14. The encoder 15 detects the rotation number and feeds back the encoder pulse Sse for the servo control of the spindle motor 14 to the spindle servo unit 13.

The transfer servo unit 16 outputs a drive signal Sod for the servo control of the movement amount of the transfer table 11 via the transfer mechanism 18, on the basis of the encoder pulse Soe from the linear scale 12 and a reference signal Sro from the reference generator 17.

The reference generator 17 outputs the reference signal Sro for the servo control of the transfer servo unit 16 and the spindle reference signal Srs for the servo control of the spindle servo unit 13, on the basis of a radial position r, a rotation number N, the changing rate RN in the rotation number, and so on, which are calculated by the system controller 1, and the radial position signal Sr, which is outputted from the linear scale 12, under the control of the system controller 1. The transfer mechanism 18 is provided with a mechanical portion such as a transferring screw, and is constructed to move the transfer table 11 in the radial direction of the optical disc 102 on the basis of the drive signal Sod from the transfer servo unit 16.

The input unit 19 is provided with, for example, a key board, and is constructed to input data for initial setting etc., to the system controller 1.

Figure 2:
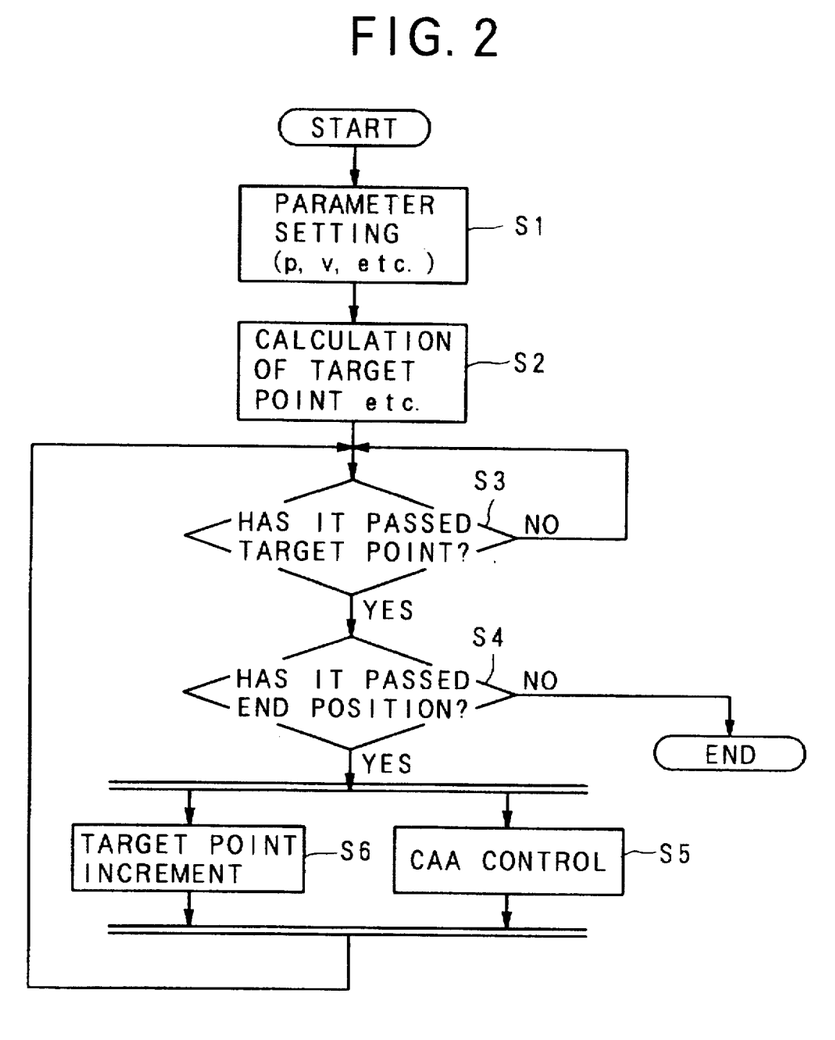
FIG. 2 is a flow chart showing an operation of the first embodiment.
Figure 3:
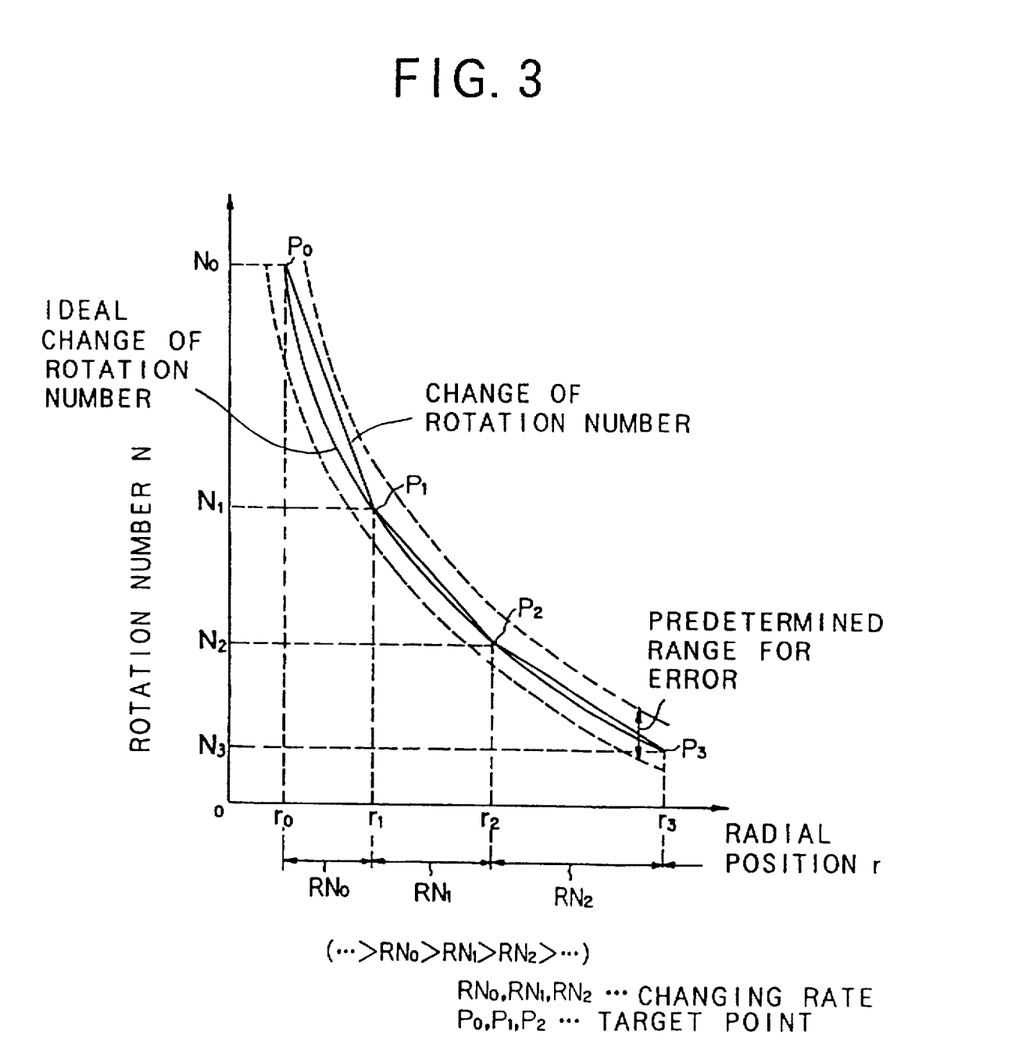
FIG. 3 is a graph showing a relationship between the radial position and the rotation number in the first embodiment.

Next, the operation of the above described recording apparatus 101 as the first embodiment will be explained with reference to FIGS. 1 to 3. FIG. 2 shows the flow chart of the operation. In FIG. 3, the ideal relationship between the radial position of the optical pickup and the rotation number thereof for the CLV method is compared with that of the present embodiment, wherein, the x axis represents the radial position r from the most inner circumference portion of the recordable region of the optical disc 102, and the y axis represents the rotation number of the optical disc 102.

In FIG. 2, the ideal linear velocity v, to which the actual linear velocity of the optical disc 102 is to follow, and the track pitch p of the information track, to which the information is to be recorded on the optical disc 102, are inputted from the input unit 19 and are set to the system controller 1 (step S1).

Then, in the system controller 1, the radial position r ($r_0$ to $r_3$ in FIG. 3) on the optical disc 102 corresponding to target points ($P_0$ to $P_3$ in FIG. 3) where the changing rate RN is switched over, the rotation number N ($N_0$ to $N_3$ in FIG. 3) at each target point and the changing rate RN between the adjacent target points, are calculated on the basis of the inputted linear velocity v and the track pitch p to change the changing rate RN of the rotation number gradually by stages such that the error in the actual rotation number of the optical disc 102 with respect to the ideal relationship between the radial position and the rotation number in case of rotating the optical disc 102 at the constant linear velocity may be in the predetermined range which is set in advance on the basis of the tolerable error etc. of the reproducing apparatus in case of reproducing the optical disc 102 (step S2). The calculation of each parameter in the step S2 will be described later in detail.

Then, the rotation of the optical disc 102 is started by the spindle motor 14 according to the initial values of the calculated rotation number N and the changing rate RN which have been calculated in the step S2. At the same time, recording the information is started by starting the movement of the optical pickup (i.e. the dynamic optical system 9) from the inner circumference side toward the outer circumference side of the optical disc 102.

Then, it is judged whether or not it has passed one target point (e.g. the target point Pi in FIG. 3) on the basis of the radial position signal Sr from the linear scale 12 (step S3). If it has not passed yet (step S3; NO), the CAA control is performed while maintaining the changing rate RN before the judgment (e.g. $RN_0$ in FIG. 3) and the rotation is continued.

If it has passed (step S3; YES), it is further judged whether or not it has passed an end position (the most outer circumference position) of the recordable area on the optical disc 102 (step S4). If it has passed the end position (step S4; YES), the recording operation is finished.

If it has not passed yet (step S4; NO), the changing rate RN of the rotation number is switched over at the target point (i.e. $P_1$), and the CAA control is performed by use of the changing rate after the switching operation (e.g. the changing rate $RN_1$ in FIG. 3), and the rotation is continued (step S5). At this time, along with the step S5, updating (increment) of the target point is performed (e.g. the target point P1 is replaced by the target point P2 in FIG. 3) (step S6). After that, the flow returns to the step S3 so as to continue the above successive operations until the end position of the recordable area.

Next, the calculation methods of the radial position r, the rotation number N at each target point and the changing rate RN between the adjacent target points at the step S2 will be explained with referring to FIG. 3.

The switching timing of the changing rate RN in the first embodiment is calculated by equally setting the time interval t in advance. Namely, the time interval t between the adjacent target points $P_0$ and $P_1$, the time interval t between the adjacent target points $P_1$ and $P_2$, and the time interval t between the adjacent target points $P_2$ and $P_3$ in FIG. 3 are all equal to each other. For example, these time intervals are all set to be 10 seconds. The time interval t is set for all areas of the optical disc 102 to be such a value that the error of the change in the rotation number with respect to the ideal rotation number is within the predetermined range as shown in FIG. 3. Then, on the basis of the time interval t and the ideal linear velocity v to follow, the radial position r of each target point, the rotation number N at each target point and the changing rate RN are calculated by the system controller 1.

More concretely, at first, on the basis of the radial position $r_0$ at the most inner circumference of the recordable area of the optical disc 102 (which is 23 mm from the center of the disc in case of the CD (Compact Disc)) and the linear velocity v, the rotation number $N_0$ at the radial position $r_0$ is calculated by a following expression (1).

$$N_0 = v / (2 \pi r_0) \quad (1)$$

Here, in case of maintaining the rotation number N, the distance $\Delta r$ in the radial direction over which the optical pickup is to move during the time period $\Delta t$ from the radial position r is approximated by a following expression (2).

$$\Delta r = p \times N \times \Delta T \quad (2)$$

In the above expression (2), the parameter p represents the track pitch of the information track of the optical disc 102.

Therefore, the radial position $r_{n+1}$ at which the optical pickup is to be located after $\Delta t$ from the position of the radial position $r_n$ is expressed by a following expression (3) on the basis of the expressions (1) and (2).

$$\begin{aligned} r_{n+1} &= r_n + \Delta r \\ &= r_n + P \times \{v/(2\pi r_n)\} \times \Delta t \end{aligned} \quad (3)$$

Thus, on the basis of the expression (3), the radial positions $r_1, r_2, r_3, \ldots$ of the target points $P_1, P_2, P_3, \ldots$ for every 10 seconds (i.e. $\Delta t$) from the radial position $r_0$ in the expression (1) are obtained one after another by the system controller 1 until the most outer circumference of the recordable area of the optical disc 102, and that the rotation number N at each target point is calculated according to the expression (1). Then, the changing rate RN of the rotation number N between the adjacent target points, is calculated on the basis of the rotation number N at each calculated target point. For example, the changing rate $RN_1$ between the adjacent target points P1 and P2 in FIG. 3 is calculated by a following expression (4) assuming that the time interval between the target points $P_1$ and $P_2$ is t (=10 seconds).

$$RN_1 = (N_1 - N_2)/t \quad (4)$$

At this time, as shown in FIG. 3, the changing rate RN is gradually decreased by stages as it goes toward the outer circumference side of the optical disc 102.

Nextly, the CAA control at the step S5 is explained with referring to FIGS. 1 to 3.

The CAA control at the step S5 is performed by changing the frequency of the spindle reference signal Srs, which is outputted from the reference generator 17, on the basis of the radial position r and the rotation number N at each target point and the changing rate RN of the rotation number N between the adjacent target points, which have been calculated by the system controller 1.

Namely, on the basis of the linear velocity v, the track pitch p etc., inputted at the step S1, the radial position r and the rotation number N at each target point and the changing rate RN of the rotation number N between the adjacent target points, which have been calculated in advance, are inputted to the reference generator 17.

Then, the rotation of the optical disc 102 is started. When the radial position signal Sr is inputted from the linear scale 12, the radial position of the dynamic optical system 9 (i.e. the optical pickup) is detected on the basis of the radial position signal Sr by the reference generator 17. If the radial position of the dynamic optical system 9 is for example, the target point $P_1$ in FIG. 3, the rotation number $N_1$ at that time is set as the start rotation number, and the rotation number $N_2$ at the target point $P_2$ is set as the stop rotation number. By use of these start rotation number and the stop rotation number, the frequency of the spindle reference signal Srs is swept by gradually changing the divisional ratio of the synthesizer, which is included in the reference generator 17, on the basis of the changing rate $RN_1$.

According to the first embodiment as described above, since the changing rate RN with respect to the radial position r is changed gradually by stages, the error of the actual rotation number r with respect to the ideal relationship between the radial position r and the rotation number N in case of rotating the optical disc 102 by a constant linear velocity v can be within the predetermined range, and the change of the actual rotation number N with respect to the radial position r can be the change close to the ideal relationship between the radial position r and the rotation number N.

Further, since the frequency of the spindle reference signal Srs to control the rotation number r is changed gradually by stages, the phase error due to a drastic change in the spindle reference signal Srs i.e. the drastic change in the rotation number N can be reduced.

In the above explained first embodiment, the rotation number N of the spindle motor 14 is controlled on the basis of the spindle reference signal Srs from the reference generator 17. However, the present embodiment is not limited to this. Instead, the radial position r, the rotation number N at each target point and the changing rate RN of the rotation number N between the adjacent target points, which have been calculated by the system controller 1, may be inputted into the pre-formatter of the record signal process unit 5, so that the spindle motor 14 and the transfer motor 16 may be controlled on the basis of those parameters and the address information of the record signal outputted by the pre-formatter, by outputting the spindle reference signal Srs and the reference signal Sro from the pre-formatter as indicated by a dotted line in FIG. 1.

Further, at the step S3 of the first embodiment, it is judged whether or not it has passed each target point on the basis of the radial position signal Sr from the linear scale 12. However, the present embodiment is not limited to this. Instead, by setting the time interval t between the adjacent target points in advance, it is possible to judge whether or not it has passed each target point by measuring this time period t by a timer, for example.

(II) Second Embodiment

The second embodiment will be explained with referring to FIGS. 1, 4 and 5.

The hardware construction of the second embodiment is the same as that of the first embodiment of FIG. 1.

Next, the operation of the second embodiment will be explained with referring to FIGS. 4 and 5. FIG. 4 shows the flow chart of the operation. In FIG. 4, the steps same as those in FIG. 2 carry the same reference numerals and the detailed explanations thereof are omitted. In FIG. 5, the ideal relationship between the radial position of the optical pickup and the rotation number thereof for the CLV method is compared with that of the present embodiment, wherein, the x axis represents the radial position r from the most inner circumference portion of the recordable region of the optical disc 102, and the y axis represents the rotation number of the optical disc 102.

Figure 4:
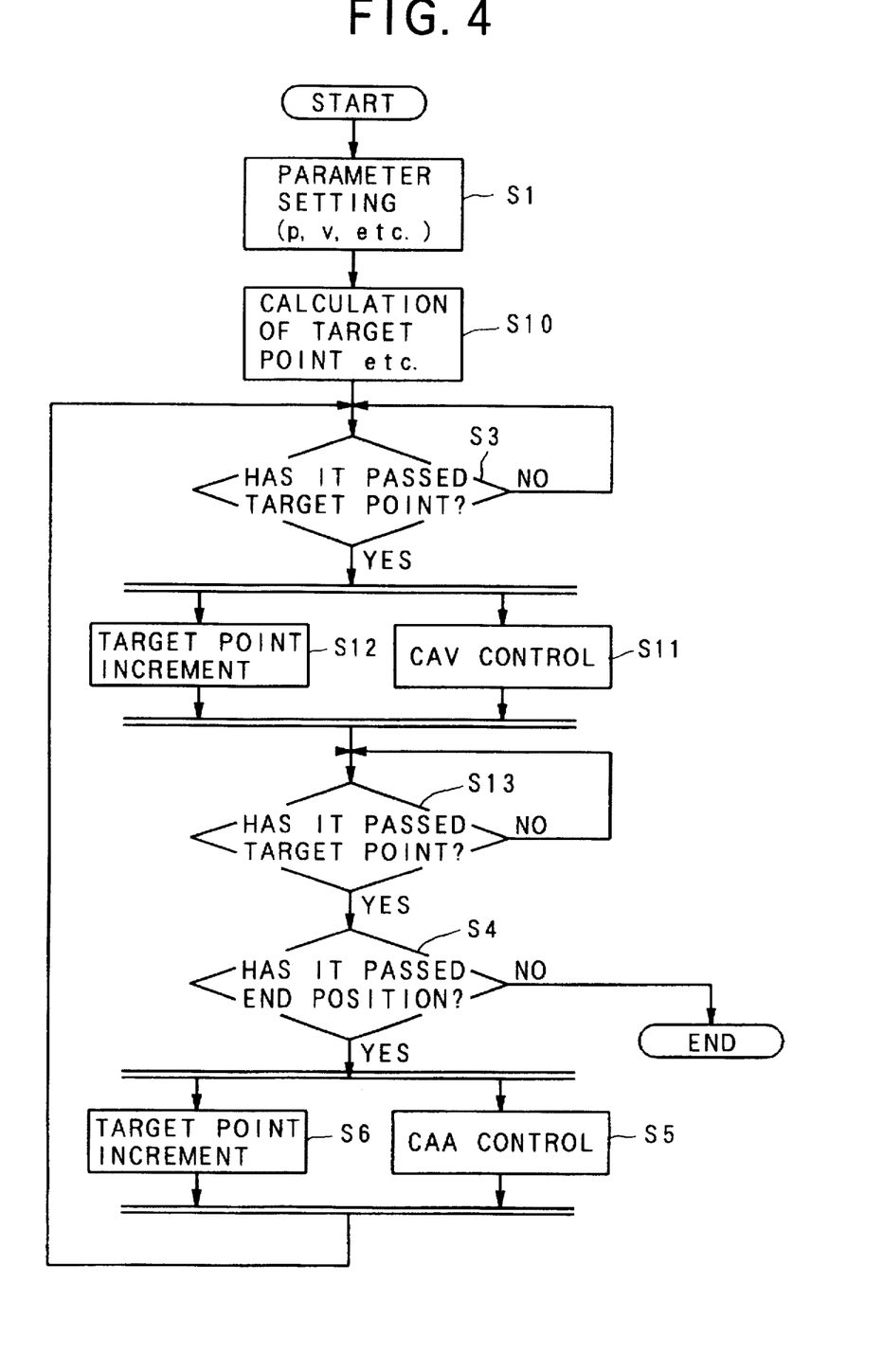
FIG. 4 is a flow chart showing an operation of a second embodiment of the present invention.

In FIG. 4, firstly, the ideal linear velocity v, to which the actual linear velocity of the optical disc 102 is to follow, and the track pitch p of the information track, to which the information is to be recorded on the optical disc 102, are inputted from the input unit 19 and are set to the system controller 1 (step S1).

Then, in the system controller 1, the radial position r ($r_{10}$ to $r_{15}$ in FIG. 4) on the optical disc 102 corresponding to target points ($P_{10}$ to $P_{15}$ in FIG. 4) where the changing rate RN ($RN_{10}$ to $RN_{15}$ in FIG. 4) is switched over, the rotation number N ($N_{10}$, $N_{12}$ and $N_{14}$ in FIG. 4) at each target point and the changing rate RN between the adjacent target points, are calculated on the basis of the inputted linear velocity v and the track pitch p to alternatively set the first interval, where the rotation number changes at a constant changing rate, and a second interval, where the rotation number is constant, such that the error in the actual rotation number of the optical disc 102 with respect to the ideal relationship between the radial position and the rotation number in case of rotating the optical disc 102 at the constant linear velocity may be in the predetermined range which is set in advance (step S10). The calculation of each parameter in the step S10 will be described later in detail.

Then, the rotation of the optical disc 102 is started by the spindle motor 14 according to the initial value of the calculated rotation number N and the initial value of the changing rate RN which have been calculated in the step S10 while maintaining the initial value of the rotation number N or the changing rate RN. At the same time, recording the information is started by starting the movement of the optical pickup (i.e. the dynamic optical system 9) from the inner circumference side toward the outer circumference side of the optical disc 102.

Then, it is judged whether or not it has passed one target point (e.g. the target point $P_{10}$ in FIG. 4) on the basis of the radial position signal Sr from the linear scale 12 (step S3). If it has not passed yet (step S3; NO), the CAA control is performed while maintaining the rotation number N or the changing rate RN before the judgment and the rotation is continued.

If it has passed the target point $P_{10}$ (step S3; YES), the rotation control is performed on the basis of the CAV control (step S11), and the updating operation (i.e. the increment) of the target point is performed i.e. the target point $P_{10}$ is changed to the target point $P_{11}$ in FIG. 4 (step S12).

Nextly, it is further judged whether or not it has passed the target point $P_{11}$ (step S13). If it has not passed yet (step S13; NO), the CAV control is continued as it is. If it has passed the target point $P_{11}$ (step S13; YES), the process of the step S4, which has been explained in the first embodiment, is performed (step S4).

If it has not passed the end position yet (step S4; NO), the changing rate RN of the rotation number N is switched over at the target point $P_{11}$ and the CAA control is performed by use of the changing rate after the switching operation (e.g. the changing rate $RN_{11}$ in FIG. 4), and the rotation is continued (step S5). At this time, along with the step S5, updating (increment) of the target point is performed (e.g. the target point $P_{11}$ is replaced by the target point $P_{12}$ in FIG. 3) (step S6). After that, the flow returns to the step S3 so as to continue the above successive operations until the end position of the recordable area.

Figure 5:
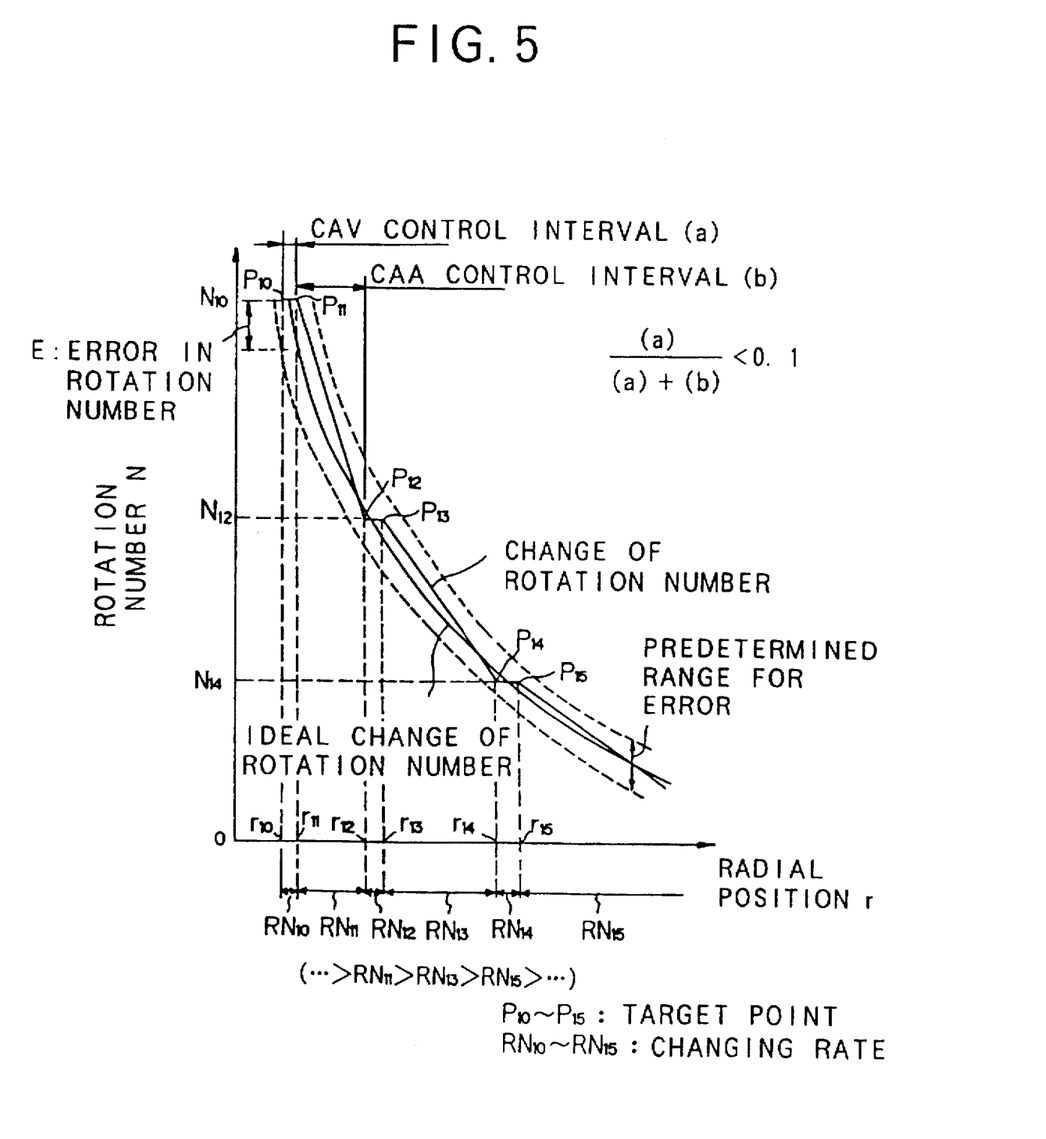
FIG. 5 is a graph showing a relationship between the radial position and the rotation number in the second embodiment.

In the second embodiment, since the first interval (where the changing rate RN is a constant value which is not zero) and the second interval(where the changing rate RN is zero) are always alternatively set, it is possible to control the rotation number to change as shown in FIG. 5 by repeating the above mentioned processes.

Nextly, the calculation methods of the radial position r, the rotation number N at each target point and the changing rate RN between the adjacent target points at the step S10 will be explained with referring to FIG. 5.

The switching timing of the changing rate RN in the second embodiment is calculated by equally setting the time interval t in advance. Namely, the time interval t between the adjacent target points $P_{10}$ and $P_{12}$ and the time interval t between the adjacent target points $P_{12}$ and $P_{14}$ in FIG. 4 are all equal to each other, and that the length of the CAA control interval (i.e. the first interval) is set longer than that of the CAV control interval (i.e. the second interval) such that the error of the actual change in the rotation number with respect to the ideal change of the rotation number may be within the predetermined range over the whole area of the optical disc 102 as shown in FIG. 5. For example, the time period corresponding to the length of the second interval (i.e. the interval between the target points $P_{10}$ and $P_{11}$, the interval between the target points $P_{12}$ and $P_{13}$, and the interval between the target points $P_{14}$ and $P_{15}$ in FIG. 5) is set to 1 second, while the time period corresponding to the length of the first interval (i.e. the interval between the target points $P_{11}$ and $P_{12}$, and the interval between the target points $P_{13}$ and $P_{14}$) is set to 9 seconds. Then, on the basis of these time intervals and the ideal linear velocity to follow, the radial position r of each target point, the rotation number N at each target point, and the changing rate RN between the adjacent target points, are calculated by the expressions (1) to (4) explained in the first embodiment.

For example, as shown in FIG. 5, assuming that the radial position is $r_{10}$ at the target point $P_{10}$, the rotation number $N_{10}$ at that time is calculated according to the expression (1), and the CAV control for 1 second is performed on the basis of this calculated rotation number $N_{10}$, and the radial position $r_{11}$ at the next target point $P_{11}$ is calculated according to the expressions (2) and (3). Nextly, on the basis of the radial position $r_{11}$ and the rotation number $N_{10}$ at the target point $P_{11}$, the radial position $r_{12}$ and the rotation number $N_{12}$ at the next target point $P_{12}$ are calculated according to the expressions (1) to (3). By repeating the same processes after that, the radial position r and the rotation number N corresponding to each target point are calculated. Then, the changing rate RN of the rotation number N between the adjacent target points for the CAA control is calculated according to the expression (4) on the basis of the rotation number N at each calculated target points P and the time period (i.e. 9 seconds) corresponding to the length of the time interval for performing the CAA control. At this time, as shown in FIG. 5, the changing rate RN corresponding to each interval for the CAA control is gradually decreased by stages as it goes toward the outer circumference side of the optical disc 102.

Further, the CAA control at the step S5 is performed by changing (i.e. sweeping) the frequency of the spindle reference signal Srs outputted from the pre-formatter of the record signal process unit 5 or the reference generator 17, on the basis of the radial position r and the rotation number N at each target point and the changing rate RN which have been calculated at the step S10. In the CAV control interval, the frequency of the spindle reference signal Srs is not changed.

According to the above mentioned second embodiment, since the first interval where the changing rate RN of the rotation number N is constant is set longer than the second interval where the rotation number N is constant, the error of the actual rotation number N with respect to the ideal relationship between the radial position r and the rotation number N in case of rotating the optical disc 102 at the constant linear velocity, can be within the predetermined range which is set in advance, and that the change in the actual rotation number N with respect to the radial position r can be the change close to the ideal relationship between the radial position r and the rotation number N.

More concretely, the error E of the rotation number N takes its maximum value at the target point $P_{11}$ as shown in FIG. 5, if the CAA control is started from the target point $P_{11}$ in case that the interval for the CAV control is 1 second. At this time, the radial position $r_{11}$ of the target point $P_{11}$ is obtained as 23.0155 mm according to the expression (3) assuming that the ideal linear velocity to follow v=1.4 m/s, the track pitch p=1.6 μm, and the radial position $r_{10}$=23 mm.

Here, since the rotation number $N_{10}$ at the target point $P_{10}$ is indicated by the expression (1) and is maintained until the target point $P_{11}$, the following expressions are concluded, assuming that the linear velocity at the target point $P_{11}$ is $v_{11}$, the linear velocity at the target point $P_{10}$ is $v_{10}$ (=1.4 m/s).

$$N_{10} = v_{10}/(2\pi r_{10}) = v_{11}/(2\pi r_{11})$$
$$\therefore v_{11} = \{v_{10}/(2\pi r_{10})\} \times (2\pi r_{11})$$
$$= 1.40094 \ m/s$$

Accordingly, the error with respect to the ideal velocity to follow v (i.e. 1.4 m/s) is just 0.00094 m/s. On the contrary to this, according to the aforementioned related art of FIG. 8, since the interval for the CAV control is set longer than the interval for the CAA control, the error becomes much larger than that of the present embodiment. For example, assuming that the time period corresponding to the interval for the CAV control is 9 seconds, and that the time period corresponding to the interval for the CAA control is 1 second, the linear velocity Vmax, which is the maximum value, is calculated as following.

Vmax=1.4085 m/s

Thus, the error is as much as 0.0085 m/s, which is about ten times as large as that of the present embodiment.

Further, according to the second embodiment, since the frequency of the spindle reference signal Srs for controlling the rotation number N is gradually changed by stages, it is possible to reduce the phase error due to the drastic change of the spindle reference signal Srs i.e. the drastic change in the rotation number N.

In the above described first and second embodiments, the present invention is adapted to the recording apparatus for optically recording the information onto the optical disc 102. However, the present invention is not limited to this. Instead, the present invention can be adapted to the reproducing apparatus for optically reproducing the information recorded on the optical disc. Here, in case of reproducing the optical disc which has been recorded by the first or second embodiment,, by controlling the rotation number on the basis of the clock signal or the synchronization signal extracted from the reproduced signal without detecting the radial position of the optical pickup, it is possible to change the rotation number of the optical disc such that the changing rate of the rotation number is gradually reduced by stages in case of reproducing the optical disc recorded by the first embodiment, and it is possible to change the rotation number of the optical disc such that the first interval where the rotation number is changed by the constant changing rate and the second interval where the rotation number is constant are alternatively disposed, and that the first interval is longer than the second interval, in case of reproducing the optical disc recorded by the second embodiment.

Further, the method of recording and reproducing the information of the present invention is not limited to the optical type, but can be adapted to recording and reproducing method of other recording and reproducing type such as a magnetic recording and reproducing type as long as the record medium has a disc shape.

Furthermore, the present invention is suitable for the servo control of the spindle motor 14 in recording and reproducing the digital signal with respect to the optical disc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of controlling a rotation number of a motor adapted to rotate a record medium, having a disc shape, with respect to a pickup which performs at least one of recording and reproducing operations on the record medium, the method comprising steps of:

setting a constant linear velocity of the record medium inputted from an input device;

calculating (i) an ideal rotation number of the motor on the basis of the set constant linear velocity to keep the linear velocity of the record medium constant regardless of a radial position of the pickup with respect to the record medium, (ii) switching positions on the record medium on the basis of the calculated ideal rotation number, a changing rate of an actual rotation number of the motor in a radial direction of the record medium changing at each of the switching positions, (iii) the rotation number at each of the switching positions on the basis of the calculated ideal rotation number, and (iv) the changing rate between each of the calculated switching positions adjacent to each other on the basis of the calculated ideal rotation number;

determining whether the radial position of the pickup passes each of the calculated switching positions when the pickup is performing one of the recording and reproducing operations; and controlling the motor to change the actual rotation number to be equal to the calculated rotation number corresponding to each of the calculated switching positions when it is determined that the radial position of the pickup passes each of the calculated switching positions, and to change the actual rotation number by the calculated changing rate between said each of the adjacent calculated switching positions.

2. The method according to claim 1, wherein the calculating step includes the substep of calculating the changing rate between each of the adjacent calculated switching positions such that the changing rate has a value other than zero with respect to an entire recordable area of the record medium.

3. The method according to claim 1, wherein the calculating step includes the substep of calculating the changing rate between each of the adjacent calculated switching positions such that the changing rate gradually decreases toward an outer circumference of the record medium.

4. A method of controlling a rotation number of a motor adapted to rotate a record medium, having a disc shape, with respect to a pickup, which performs at least one of recording and reproducing operations on the record medium, the method comprising steps of:

setting a constant linear velocity of the record medium inputted from an input device;

calculating (i) an ideal rotation number of the motor on the basis of the set constant linear velocity to keep the linear velocity of the record medium constant regardless of a radial position of the pickup with respect to the record medium, (ii) switching positions on the record medium on the basis of the calculated ideal rotation number and corresponding to each of a plurality of first intervals and each of a plurality of second intervals an actual rotation number of the motor changing by a constant changing rate in a radial direction of the record medium in each of the first intervals, the actual rotation number of the motor being constant in each of the second intervals, (iii) the constant changing rate in each of the first intervals on the basis of the calculated ideal rotation number, and (iv) the actual rotation number in each of the second intervals on the basis of the calculated ideal rotation number, the first intervals and the second intervals being alternatively disposed;

determining whether the radial position of the pickup passes each of the calculated switching positions when the pickup is performing one of the recording and reproducing operations; and controlling the motor to change the calculated constant changing rate of the actual rotation number corresponding to each of the first intervals to be equal to the calculated changing rate when it is determined that the radial position of the pickup passes each of the calculated switching positions corresponding to each of the first intervals, and to change the actual rotation number to be equal to the calculated rotation number corresponding to each of the second intervals when it is determined that the radial position of the pickup passes each of the calculated switching positions corresponding to each of the second intervals.

5. The method according to claim 4, wherein a length of each of the first intervals is longer than a length of each of the second intervals adjacent to said each of the first intervals.

6. The method according to claim 5, wherein a ratio of a time period corresponding to the length of said each of the second intervals with respect to a time period corresponding to a total length of said each of the second intervals and said each of the first intervals adjacent to said each of the second intervals is not greater than 0.1.

7. The method according to claim 4, wherein the calculating step includes the substep of calculating the constant changing rate in each of the first intervals such that the constant changing rate gradually decreases toward an outer circumference of the record medium.

8. An apparatus for controlling a rotation number of a motor adapted to rotate a record medium, having a disc shape, with respect to a pickup which performs at least one of recording and reproducing operations on the record medium, the apparatus comprising:

setting means for setting a constant linear velocity of the record medium inputted from an input device;

calculation means for calculating (i) an ideal rotation number of the motor on the basis of the set constant linear velocity to keep the linear velocity of the record medium constant regardless of a radial position of the pickup with respect to the record medium, (ii) switching positions on the record medium on the basis of the calculated ideal rotation number, a changing rate of an actual rotation number of the motor in a radial direction of the record medium changing at each of the switching positions, (iii) the rotation number at each of the switching positions on the basis of the calculated ideal rotation number, and (iv) the changing rate between each of the calculated switching positions adjacent to each other on the basis of the calculated ideal rotation number;

determining means for determining whether the radial position of the pickup passes each of the calculated switching positions when the pickup is performing one of the recording and reproducing operations; and a controller for controlling the motor to change the actual rotation number to be equal to the calculated rotation number corresponding to each of the calculated switching positions when the determining means determines that the radial position of the pickup passes each of the calculated switching positions, and to change the actual rotation number by the calculated changing rate between said each of the adjacent calculated switching positions.

9. The apparatus according to claim 8, wherein the calculation means includes means for calculating the changing rate between each of the adjacent calculated switching positions such that the changing rate has a value other than zero with respect to an entire recordable area of the record medium.

10. The apparatus according to claim 8, wherein the calculation means includes means for calculating the changing rate between each of the adjacent calculated switching positions such that the changing rate gradually decreases toward an outer circumference of the record medium.

11. An apparatus for controlling a rotation number of a motor adapted to rotate a record medium, having a disc shape, with respect to a pickup which performs at least one of recording and reproducing operations on the record medium, the apparatus comprising:

setting means for setting a constant linear velocity of the record medium inputted from an input device;

calculation means for calculating (i) an ideal rotation number of the motor on the basis of the set constant linear velocity to keep the linear velocity of the record medium constant regardless of a radial position of the pickup with respect to the record medium, (ii) switching positions on the record medium on the basis of the calculated ideal rotation number and corresponding to each of a plurality of first intervals and each of a plurality of second intervals an actual rotation number of the motor changing by a constant changing rate in a radial direction of the record medium in each of the first intervals, the actual rotation number of the motor being constant in each of the second intervals, (iii) the constant changing rate in each of the first intervals on the basis of the calculated ideal rotation number, and (iv) the actual rotation number in each of the second intervals on the basis of the calculated ideal rotation number, the first intervals and the second intervals being alternatively disposed;

determining means for determining whether the radial position of the pickup passes each of the calculated switching positions when the pickup is performing one of the recording and reproducing operations; and a controller for controlling the motor to change the calculated constant changing rate of the actual rotation number corresponding to each of the first intervals to be equal to the calculated changing rate when the determining means determines that the radial position of the pickup passes each of the calculated switching positions corresponding to each of the first intervals, and to change the actual rotation number to be equal to the calculated rotation number corresponding to each of the second intervals when the determining means determines that the radial position of the pickup passes each of the calculated switching positions corresponding to each of the second intervals.

12. The apparatus according to claim 11, wherein a length of each of the first intervals is longer than a length of each of the second intervals adjacent to said each of the first intervals.

13. The apparatus according to claim 12, wherein a ratio of a time period corresponding to the length of said each of the second intervals with respect to a time period corresponding to a total length of said each of the second intervals and said each of the first intervals adjacent to said each of the second intervals is not greater than 0.1.

14. The apparatus according to claim 11, wherein the calculation means includes means for calculating the constant changing rate in each of the first intervals such that the constant changing rate gradually decreases toward an outer circumference of the record medium.

* * * * *